May 17, 1955 C. G. HOLT 2,708,277
DIE AND TAP DRIVE MEANS FOR TURRET LATHES
Filed Sept. 4, 1952 2 Sheets-Sheet 1

INVENTOR:
CLAUDE G. HOLT,
BY
*Fred J. Iverson*
ATTORNEY.

May 17, 1955     C. G. HOLT     2,708,277
DIE AND TAP DRIVE MEANS FOR TURRET LATHES
Filed Sept. 4, 1952     2 Sheets-Sheet 2
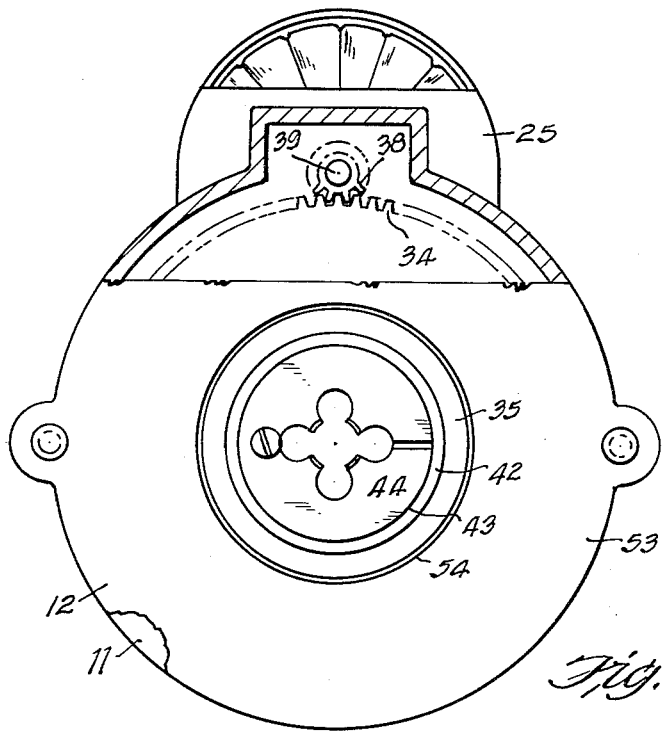
Fig. 2.
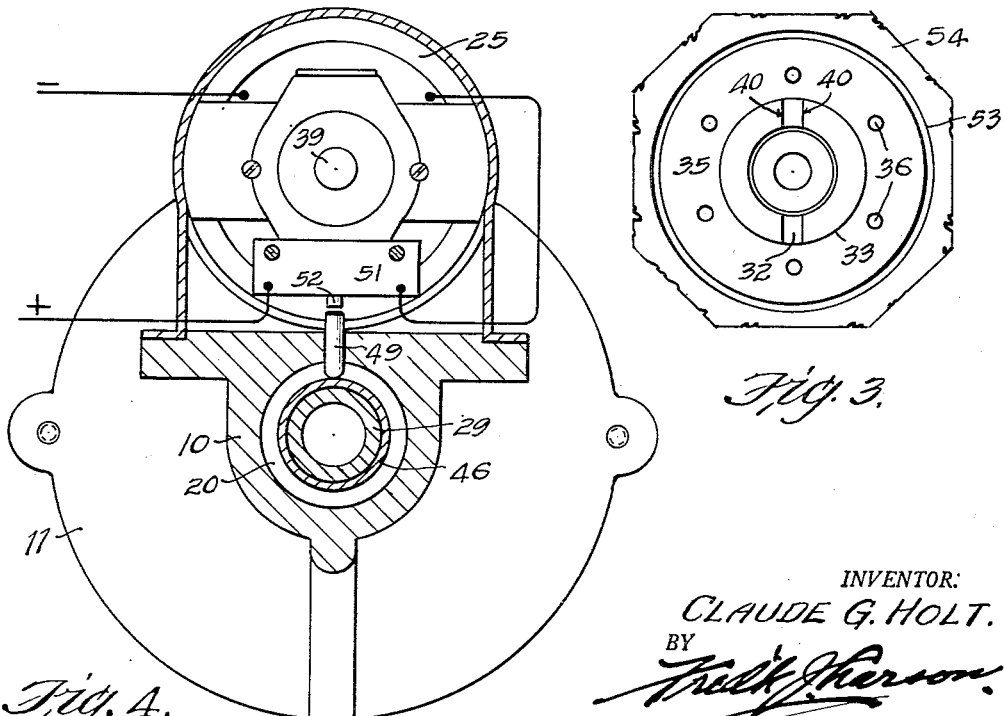
Fig. 3.
Fig. 4.
INVENTOR:
CLAUDE G. HOLT.
BY
ATTORNEY.

United States Patent Office 2,708,277
Patented May 17, 1955

2,708,277

DIE AND TAP DRIVE MEANS FOR TURRET LATHES

Claude G. Holt, St. Johns Village, Mo.

Application September 4, 1952, Serial No. 307,880

1 Claim. (Cl. 10—89)

My present invention relates to die and tap drive means for turret lathes.

The primary object of the invention is to provide a turret lathe fixture, device, or attachment for turret lathes that will carry a die, or a tap, to screw-thread a part revolving with the lathe spindle, and to rotate the die, or tap in the same direction of rotation as the lathe spindle but at a greater speed than the turret spindle when retracting the die, or the tap from the part after the part has been provided with the required screw-threads.

Another object of the invention is to provide novel means for setting up rotary motion to a die, or a tap, after a screw threading operation, on a turret lathe to retract the die, or tap from the screw-threaded part by rotating the die, or tap in the same direction as the lathe spindle, but at a greater speed of rotation.

A further object of the invention is to provide a fixture for turret lathes that will eliminate a percentage of shock to a tap and to a die carried thereby.

A further object of the invention is the provision of a screw threading device for turret lathes that will overcome certain practical objections to, and defects in, the present method of cutting screw-threads on a part in a turret lathe.

A still further object of this invention is the provision of a screw threading fixture for turret lathes which is simple, durable and inexpensive in construction, and which in use is thoroughly efficient and practical.

I achieve the foregoing objects and such other objects and advantages as may hereinafter appear, or be pointed out, in the manner illustratively exemplified in the accompanying drawings, wherein:

Fig. 2 is a front elevation of the device showing a die carried in the die holder, and showing the front cover plate thereof partly broken away.

Fig. 3 is a fragmentary view, in front elevation, of a portion of the device with the tool holder.

Fig. 4 is a view taken on line 4—4 of Fig. 1, looking in the direction of the arrows.

Figure 1:
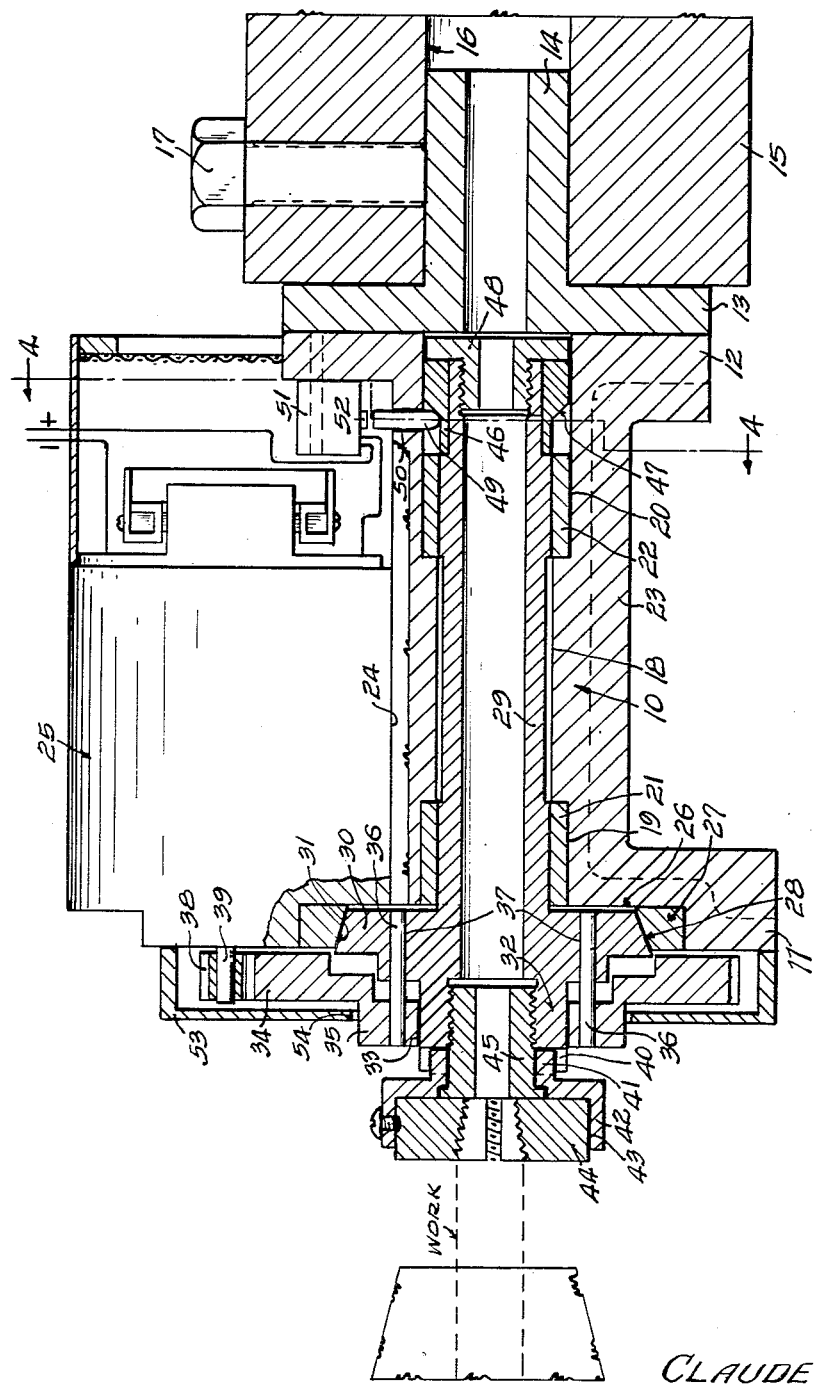
Fig. 1 is a view partly in sectional elevation and partly in side elevation of the device embodying the features of my invention.

Referring to the drawings, wherein for the purpose of illustration, is shown a preferred embodiment of the invention, the reference character 10 designates a body member having a forward flange 11, and a rear flange 12 for attachment to a flange 13 from which flange projects a shank 14 for attachment to one of the stations of a turret 15 of a turret lathe, by entering an opening 16 therein and which is held against displacement by means of a suitable fastening device 17, as clearly apparent from Fig. 1. The body 10 is provided with a longitudinal bore 18 enlarged at both ends thereof, as at 19 and 20, to receive suitable bearings 21 and 22, respectively. The body 10 may be provided with a suitable reinforcing rib 23 at the lower side thereof, and, the top face 24 of the body 10 may be flat for supporting a suitable electric motor designated, generally, as 25. The face of the front flange 11 is circularly recessed, as at 26, to receive a stationary female friction clutch ring 27 having a tapered friction face 28.

The reference numeral 29 designates, generally, a hollow, or tubular tool supporting spindle which is rotatably and longitudinally slidably mounted in the bearings 21 and 22. The forward end portion of the spindle 29 is provided with a male clutch member 30 having a tapered friction face 31 adapted for engagement with, and disengagement from the tapered friction face 28 of clutch ring 27.

The front end portion designated 32 of the spindle 29 which is in advance of the male friction clutch 30, is slidably mounted in a central opening 33 in a gear 34, which gear has a forwardly projecting hub portion 35 provided with a plurality of rearwardly projecting circularly arranged guide pins 36 which are slidably receivable in a like number of circularly arranged openings 37 in the male clutch member 30, thus permitting the male clutch member 30 to slide away from and toward the gear 34 when the gear is stationary, and to revolve with the gear when it is rotated by means of a meshing pinion 38 carried by the armature shaft 39 of the electric motor 25.

The front end portion 32 of the spindle 29 is provided with a plurality of teeth 40 for clutch like engagement with teeth 41 on the hub of a holder 42 having a recess 43 to receive and hold a screw-thread die indicated by the reference numeral 44. The holder 42, and its hub in form of teeth 41, is thus loosely carried on to the front end portion 32 of the spindle 29 by means of a flanged hollow member 45 having screw-threaded connection with the inner wall of the forward end portion of the spindle 29.

A tubular cam member 46 having a rearwardly inclined face 47, is mounted on the rear end portion of the spindle 29 for movement therewith and is held in position thereon by means of a flange-headed tubular member 48 having screw-threaded connection with the inner wall of the rear end portion of the spindle 29.

The reference character 49 designates a vertically movable electric switch actuating pin which is mounted in a vertically disposed opening 50 in the body 10 adjacent the inner face of the rear body flange 12. The electric switch is designated 51 and is provided with a member 52 with which the pin 49 contacts in its upward movement caused by the cam face 47 closing an electric circuit to energize the electric motor 25 to rotate the pinion 38, which, in turn, rotates the gear 34, the spindle 29, male clutch member 30 and the holder 42 after screw-threads have been cut in a part rotatably carried in a clutch, or collet rotated by the spindle of the turret lathe.

The operation of the device is as follows:

The device being attached to the turret of a turret lathe and a work part being supported by a clutch, or a collet rotated by the spindle of the turret lathe, the operator indexes the turret to the work part, or piece to be provided with screw-threads and moves the turret toward the work part, cutting threads either by die, or a tap, in the work part material. The spindle 29 in this forward movement of the turret causes pressure against the forward end thereof and the spindle 29 assumes its rearward position relative to the body 10 with the pin 49 out of contact with the cam face 47 and with the friction clutch members in engagement to prevent rotation of the spindle 29. When cutting of the screw-threads has been completed and the forward movement of the turret has reached its limit, against the predetermined stop-setting of the turret, the pull of the tap, or die by the screw-threads on the work against the spindle 29 releases the friction clutch and the die, or tap revolves at the same speed and in the same direction as the work in the turret spindle. The electric motor is energized only when the turret is retracted by hand causing spindle 29 to increase its speed in the same direction as the work greater than the rotation of the work, thus removing the tap, or die from the work without shock.

From the foregoing description, it is apparent that there are many advantages in cutting screw-threads, both internal and external, on a work part by means of a device for attachment to the turret of a turret lathe, as disclosed in this application.

The many advantages of the herein disclosed invention will readily suggest themselves to those skilled in the art to which it appertains.

What I claim is:

A screw threading device, comprising a body member having a longitudinal bore, spaced bearings provided in said bore, a stationary clutch ring provided in said body member at one end of and concentric with said bore, said clutch ring having a tapered internal friction face, a spindle rotatable and longitudinally slidable in said bearings, a second clutch ring provided on and rotatable with said spindle and having a tapered external friction face engageable with the internal friction face of said stationary clutch ring whereby said spindle is held against rotation when the clutch faces are in engagement, a threading tool holder removably secured to said spindle adjacent said second clutch ring and adapted to receive a threading tool for operatively engaging rotating work, a gear slidably mounted on said spindle between said second clutch ring and said tool holder and rotatable therewith, a motor mounted on said body member and operatively connected to said gear for rotating the same and the associated spindle and tool holder in the same direction and at substantially greater speed than the work, whereby the tool holder is retracted from the work upon completion of the threading operation, an electric switch in circuit with said motor, and means provided on and responsive to the sliding of said spindle for actuating said switch, whereby said motor is energized after said clutch faces are disengaged.

References Cited in the file of this patent

UNITED STATES PATENTS

| | | |
|---|---|---|
| 1,810,227 | Shea | June 16, 1931 |
| 2,234,962 | Cislak | Mar. 18, 1941 |
| 2,389,998 | Rosenthal | Nov. 27, 1945 |

FOREIGN PATENTS

| | | |
|---|---|---|
| 139,648 | Great Britain | Mar. 11, 1920 |